United States Patent [19]

Bonafini, Jr.

[11] Patent Number: 5,923,397
[45] Date of Patent: Jul. 13, 1999

[54] BIMODULUS CONTACT LENS ARTICLE

[75] Inventor: James A. Bonafini, Jr., Marlborough, Mass.

[73] Assignee: Bausch & Lomb Incorporated, Rochester, N.Y.

[21] Appl. No.: 08/764,657

[22] Filed: Dec. 11, 1996

Related U.S. Application Data

[60] Provisional application No. 60/013,999, Mar. 25, 1996.

[51] Int. Cl.$^6$ .............................. G02C 7/04; C08K 3/00
[52] U.S. Cl. ............................ 351/160 R; 351/160 H; 523/106
[58] Field of Search ................... 351/160 R, 160 H, 351/161, 162; 523/106

[56] References Cited

U.S. PATENT DOCUMENTS

| | | | |
|---|---|---|---|
| 3,488,111 | 1/1970 | Isen | 351/160 |
| 3,489,491 | 1/1970 | Creighton | 351/160 |
| 3,619,044 | 11/1971 | Kamath | 351/160 |
| 3,697,629 | 10/1972 | Bronstein | 264/1 |
| 3,933,411 | 1/1976 | Winner | 351/160 |
| 3,984,506 | 10/1976 | Tsuetaki | 264/1 |
| 4,197,266 | 4/1980 | Clark et al. | 264/1 |
| 4,208,362 | 6/1980 | Deichert et al. | 264/1 |
| 4,460,523 | 7/1984 | Neefe | 264/1.9 |
| 4,536,554 | 8/1985 | Drahoslav et al. | 526/264 |
| 4,710,327 | 12/1987 | Neefe | 264/1.7 |
| 4,710,328 | 12/1987 | Neefe | 264/1.7 |
| 4,921,205 | 5/1990 | Drew, Jr. et al. | 249/61 |
| 5,087,392 | 2/1992 | Burke et al. | 264/2.7 |
| 5,296,305 | 3/1994 | Baude et al. | 428/520 |
| 5,302,978 | 4/1994 | Evans et al. | 351/162 |
| 5,760,100 | 6/1998 | Nicolson et al. | 523/106 |

FOREIGN PATENT DOCUMENTS

| | | |
|---|---|---|
| 0 345 994 A2 | 12/1989 | European Pat. Off. . |
| WO 94/06621 | 3/1994 | WIPO . |
| WO 94/29756 | 12/1994 | WIPO . |

*Primary Examiner*—Scott J. Sugarman
*Attorney, Agent, or Firm*—Chris P. Konkol

[57] ABSTRACT

A bimodulus contact lens article, including both contact lenses and buttons from which contact lenses are produced. More specifically, the subject bimodulus contact lens article comprises a rigid gas-permeable polymeric core section and a soft edge section attached annularly about the core section. The edge section of the subject lens article comprises a crosslinked composition polymerized from a monomer mix including at least 15 weight percent of monomers represented by Formula I:

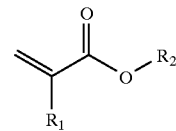

(I)

wherein $R_1$ is selected from: hydrogen and a methyl group, and $R_2$ is selected from alkyl groups having from 1 to 8 carbon atoms, so long as $R_1$ and $R_2$ are not both methyl groups. The soft edge section is annularly attached to the core section by an interpenetrating network of the crosslinked composition into the core section.

18 Claims, No Drawings

BIMODULUS CONTACT LENS ARTICLE

This application claims benefit of provisional application No. 60/013,999 filed Mar. 25, 1996.

FIELD OF THE INVENTION

The present invention is directed toward contact lens articles, including both contact lenses and "buttons" or "blanks" from which contact lenses are produced. More specifically, the present invention is directed toward bimodulus contact lens articles including a rigid gas-permeable core section and a soft edge section attached annularly about the core section.

BACKGROUND

Both rigid gas permeable, i.e. "RGP", and soft contact lenses have been available for many years. Each lens type offers certain advantages over the other. For example, RGP lenses are typically easier to clean, provide greater vision acuity, and permit for correction of astigmatism. Soft lenses on the other hand, typically offer greater comfort.

In an effort to achieve the advantages offered by both RGP and soft lenses, bimodulus lenses have been proposed. These lenses include a RGP core section with a soft edge section annularly attached about the core section. The core section comprises a conventional RGP material having a relatively high modulus and the edge section comprises a conventional soft lens material (e.g. a hydrogel), having a relatively low modulus. Such bimodulus lenses have enhanced comfort due to their soft edge section, while maintaining the aforementioned advantages provided by conventional RGP lenses. Examples of such bimodulus lenses are provided in International Applications WO/9406621 and WO 94/29756 and U.S. Pat. Nos. 3,619,044; 4,208,362; and 3,489,491.

A significant drawback to bimodulus lenses is their tendency to tear between the core and edge sections. Known techniques for attaching the core and edge sections of such lenses include thermoplastic lamination, grafting, and copolymerization between the polymeric materials of the core and edge sections. Unfortunately, none of these known techniques have produced lenses which adequately resist tearing between the edge and core sections.

SUMMARY OF THE INVENTION

The present invention is a bimodulus contact lens article, including both contact lenses and the buttons from which contact lenses are produced. More specifically, the subject bimodulus contact lens article comprises a rigid gas-permeable polymeric core section and a soft edge section attached annularly about the core section. The edge section of the subject lens article comprises a crosslinked composition polymerized from a monomer mix including at least 15 weight percent of monomers represented by Formula I:

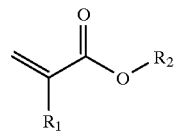

(I)

wherein $R_1$ is selected from: hydrogen and a methyl group, and $R_2$ is selected from alkyl groups having from 1 to 8 carbon atoms, so long as $R_1$ and $R_2$ are not both methyl groups. The soft edge section is annularly attached to the core section by an interpenetrating network of the crosslinked composition into the polymeric core section.

The subject invention provides a bimodulus lens with a stronger interface between the core and edge sections, thus resisting tearing and/or separation therebetween.

DETAILED DESCRIPTION OF THE INVENTION

As indicated, the present invention is a bimodulus contact lens article. The term "article" as used herein is intended to include both contact lenses and buttons or blanks from which contact lenses are produced. The term "button" as used herein refers to stock material from which lens surfaces are cut, typically by way of a lathe. Although the "articles" of the present invention include buttons, the invention is not limited to lenses produced from buttons. More specifically, the present includes contact lenses produced by cast molding and other known lens techniques.

The term "bimodulus" will be understood to refer to the difference in the modulus or stiffness, of each section of the contact lens, i.e., the RGP core section having a relatively high modulus, ranging from about 1200 to 2300 megapascals (MPa), and the edge section having a relatively low modulus, ranging from about 50 to 700 MPa. The term "modulus" as used herein refers to the flexural modulus of the material.

Although the shape and size of the core section is not narrowly critical for purposes of the present invention, the core section typically has a circular outer periphery and corresponds in dimension to the optical zone of the contact lens. The core section may be spheric or non-spheric, but is typically conical in shape. As is common with respect to RGP lens design, the core section may be designed in a variety of ways, e.g. for correcting astigmatism. The core section will typically range from about 7 to about 11 mm in diameter. The edge section of the subject lenses will typically have a width in the range of about 0.5 to 4 mm. Importantly, the use of crosslinked composition forming the edge section of the lens permits the thickness of the edge to be minimized to provide maximum comfort, while retaining sufficient mechanical integrity to avoid tearing. Preferably, edge thickness will range from about 0.04 to 0.12 mm. According to the present invention, the edge section can also be "feathered" to minimize blunt object trauma to the eyelid. The subject lenses can thereby approximate the thicknesses achieved with hydrophilic (so-called soft "hydrogel" lenses), while retaining extremely high mechanical stability as compared to hydrogel lenses.

As indicated, the core section may comprise any known or conventional rigid gas-permeable i.e. RGP, material. For the purposes of this invention, it will be understood that the term "gas-permeable" refers specifically to the oxygen permeability through the lens from the atmosphere to the cornea. RGP materials applicable to the present invention typically have an oxygen permeability of from 15 to 150× $10^{-11}$ mL $O_2$ cm$^2$/sec mL mm Hg at 35° C. Examples of applicable RGP materials prepared from silicone-containing monomers are provided in U.S. Pat. Nos. 4,152,508; 4,330,383; 4,686,267; 4,826,889; 4,826,936; 4,861,850; 4,996,275; and especially 5,346,976, the teachings of each of which are incorporated herein by reference. In preferred embodiments, the core section of the present invention is polymerized from a monomer mix including at least 5 weight percent, and preferably from 5 to about 60 weight percent of monomers represented by Formula II:

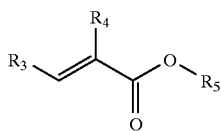

(II)

wherein: $R_3$ and $R_4$ are independently selected from: hydrogen, methyl, and a group represented by Formula III:

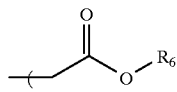

(III)

so long as if one of $R_3$ or $R_4$ is a group represented by Formula III, the other is hydrogen; and $R_5$ and $R_6$ are independently selected from: hydrogen, an alkyl group having form 1 to 12 carbon atoms, a fluoroalkyl group, and a siloxanyl group. Preferred species of the monomer represented by Formula II include itaconates, fumarates and acrylates, with itaconates being the most preferred. Preferably, the monomers represented by Formula II are itaconate esters accounting for about 20 to 55 weight percent of the polymerized material. Representative itaconates include methyl itaconate, dimethyl itaconate, phenyl itaconate, methyl phenyl itaconate, bis(1,1,1,3,3,3-hexafluoro-2-propyl) itaconate and bis (2H, 2H-perfluorobenzyl) itaconate.

Preferably, the monomer mix further includes at least 3 weight percent, but preferably from about 3 to 25 weight percent of monomers represented by Formula IV:

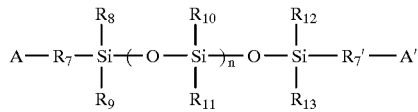

(IV)

wherein A and A' are independently selected from activated unsaturated radicals (e.g. (meth)acryloxy, (meth)acrylamido and styryl, wherein the term "(meth)" denotes optional methyl substitution); $R_7$ and $R_{7'}$ are independently selected from divalent hydrocarbon radicals having from 1 to 22 carbon atoms (e.g. alkylene radicals such as methylene, propylene, butylene, etc.), and $R_8$, $R_9$, $R_{10}$, $R_{11}$, $R_{12}$, and $R_{13}$ are independently selected from: monovalent hydrocarbon radicals having from 1 to 12 carbon atoms, monovalent hydrocarbon radicals having from 1 to 12 carbon atoms and further including ether linkages, halogen-substituted monovalent hydrocarbon radicals having from 1 to 12 carbon atoms, and halogen-substituted monovalent hydrocarbon radicals having from 1 to 12 carbon atoms further including ether linkages. Specific examples of such hydrocarbon groups include groups selected from: alkyl, cycloalkyl, aryl, aralkyl, alkaryl radicals, alkoxyalkyl radicals, and halogen-substituted derivatives thereof, (with alkyl groups having from 1 to 4 carbon atoms being preferred). "n" is a number averaging between about 15 and 50.

The monomer mix from which the subject RGP core sections are polymerized may further include from about 1 to about 25 weight percent hydrophilic monomers such as: hydrophilic (meth)acrylates such as 2-hydroxyethyl methacrylate; hydrophilic (meth)acrylamides such as methacrylamide and N,N-dimethylacrylamide; (meth)acrylic carboxylic acids such as methacrylic acid; and vinyl lactams, such as N-vinylpyrrolidone.

The monomer mix used in preparing the RGP material may further include other monomers and additives including various organosiloxane monomers and crosslinking agents as is known in the art. Examples of common organosiloxane monomers (exclusive of those represented by Formula IV) include tris(trimethylsiloxy)methacryloxy propylsilane, pentamethyldisiloxanylmethylmethacrylate, heptamethycyclotetrasiloxanepropylmethacrylate, heptamethylcyclotetrasiloxanemethylmethacrylate and methyldi(trimethysiloxy)methacryloxymethyl silane.

The edge section of the subject bimodulus lens article is attached annularly about the core section by way of an interpenetrating network. For the purposes of this description, the term "interpenetrating network" will be understood to mean a material containing two polymers in network form. The term is intended to encompass so-called "sequential" interpenetrating networks, wherein a first polymeric material, comprising the RGP core section, is infiltrated and interpenetrated with a monomer mixture which is polymerized to form the edge section. The monomer mixture of the edge section can be polymerized in situ in the RGP core polymer matrix, thereby forming a relatively strong bond between the edge and core section.

In order to provide a durable attachment between the core and edge sections, it is believed necessary for the polymeric composition of the edge section to have a glass transition temperature (Tg) of less than about 100° C., preferably less than about 80° C., and more preferably between about 20° C. and 80° C. Compositions have higher Tg values tend to be too brittle and hence tear along the interface between the core and edge sections. In one embodiment, the edge section has a Tg of about body temperature (approximately 37° C.). Thus, although the edege section is relatively rigid at room temperature, the edge section softens during wear.

Additionally, the monomer mixture used to form the edge section must be compatible (i.e. miscible) with the polymer composition of the core section. Such compatibility provides for a more effective interpenetrating network of the edge composition into the polymeric matrix of the core section. The edge composition must also exhibit relative low shrinkage during polymerization and cure. Polymeric compositions exhibiting high degrees of shrinkage tend to yield along the interface of the core and edge sections.

With the foregoing considerations in mind, it has been found that superior attachment between the core and edge sections is obtained when an interpenetrating network is formed using as the edge material, a crosslinked composition polymerized from a monomer mix including at least 15 weight percent and preferably from 15 to 35 weight percent of monomers represented by Formula I:

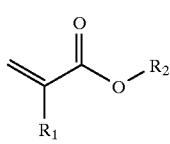

(I)

wherein $R_1$ is selected from: hydrogen and a methyl group, and $R_2$ is selected from alkyl groups having from 1 to 8 carbon atoms, (preferably having from 2 to 6 carbon atoms), so long as $R_1$ and $R_2$ are not both methyl groups. Preferred species of the monomer represented by Formula I include butyl methacrylate and butyl acrylate.

The monomers represented by Formula I provide the necessary compatibility with the polymeric compositions of the RGP core section, exhibit low shrinkage upon polymerization, and produce relatively flexible interpenetrating networks with the polymeric core section to provide for excellent attachment to the core section. It has been found that the monomers represented by Formula I having a Tg of less than about 80° C., and more preferably less than about 25° C., provided superior attachment between the edge and core sections. For example, the homopolymer of a preferred monomer species, butyl methacrylate, has a Tg of about 20° C., whereas the homopolymer of methyl methacrylate (i.e., wherein both $R_1$ and $R_2$ of Formula I are methyl) has a Tg of about 105° C.

In addition to the monomers described with respect to Formula I, the monomer mix from which the subject edge section is formed preferably includes one or more crosslinking agents. Preferred crosslinking agents include dimethacrylates. Examples of preferred dimethacrylates include polyethylene glycol dimethacrylate, neopentyl dimethacrylate and tetraethyleneglycol dimethacrylate. Other examples include methyl dimethacrylate, ethyl dimethacrylate, propyl dimethacrylate and butyl dimethacrylate. For dimethacrylates having alkyl groups comprising from 1 to 4 carbon atoms (i.e., methyl-, ethyl-, propyl-and butyl-), the dimethacrylate preferably comprises less than about 5 weight percent of the monomer mix. For polyethylene glycol (PEG) dimethacrylates the monomer mixture preferably comprises from 5 to 15 weight percent, but more preferably 8 to 12 weight percent.

The edge section may also include fluoroalkylmethacrylate or fluoroalkyl itaconate monomers. Representative fluoroalkylmethacrylates include 2,2,2-trifluoroethylmethacrylate; hexafluoroisopropyl methacrylate; bishexafluoroisopropyl itaconate; 1,1-dihydroperfluoro-2,2-dimethylpropyl acrylate; 1,1-dihydroperfluorobutyl methacrylate; 1-trifluoromethylethyl acrylate; nonafluorocyclohexyl acrylate; 1,1-dihydroperfluorooctyl methacrylate; 2,2,3,3-tetrafluoropropyl methacrylate; 1,1-dihydroperfluoropropyl acrylate; and 1,1-dihydroperfluorononyl methacrylate. In preferred embodiments, the fluoroalkylmethacrylate or fluoroalkyl itaconate comprises from about 5 to 25 weight percent of the monomer mixture, more preferably about 5 to 12 weight percent and most preferably 6 to 10 weight percent of the monomer mixture.

The edge section preferably also includes methacrylic acid, preferably comprising from about 2 to 10 weight percent of the monomer composition, but more preferably from 3 to 6 weight percent of the monomer mixture.

The edge section preferably also includes polyethyleneoxide (PEG) methacrylate, preferably comprising from about 5 to 25 weight percent of the monomer composition, more preferably about 8 to 15 weight percent, most preferably 10 to 12 weight percent of the monomer mixture.

Polymerization of the RGP core and edge sections can be achieved using free radical polymerization initiators commonly used in polymerizing unsaturated compounds known in the art. Representative polymerization initiators include 2,2-azobis(isobutyronitrile) (AIBN); 2,2'-azobis(2,4-dimethylvaleronitrile) (ADVN); 1,1-azobis (cyanocyclohexane) and 2,2'-azobis(methylbutyro-nitrile). In preferred embodiments, AIBN and ADVN are used together at combined concentrations of 0.01 to 0.4 weight percent, with preferably 0.01 to 0.1 weight percent ADMV and 0.1 to 0.3 weight percent of AIBN.

Preferred species of the crosslinked composition of the subject edge section are "non-outer swellable"; that is, they do not absorb appreciable amounts of water. Thus, when such lenses are placed in an aqueous environment, the edge section of the lens does not expand significantly. This "non-swellable" character of the edge section is very similar to the core section and helps strengthen the interface there between.

The bimodular lenses of the invention are preferably prepared in accordance to the following two steps. First, the RGP core section is prepared in a cylindrical mold having appropriate dimensions as is standard in the art. Typically the mold has a diameter from about 12 to 20 mm and is from about 15 to 305 mm in length. Suitable mold materials include glass, stainless steel and organic polymers such as poly(ethylene terephthalate), polyethylene, polypropylene, polyamides, aromatic polycarbonates, polyoxymethylene and various copolymers and polymer blends of these materials. Of particular importance in the choice of mold material is that the monomer mixture used does not adhere to the mold material. Appropriate amounts of the RGP monomer mixtures are added to the mold and polymerization allowed to proceed essentially to completion.

After the core is prepared it is ground to an appropriate diameter, typically from about 7 to 11 mm and, in a second step, the edge section is attached annularly about the RGP core section. This is accomplished by placing the cylindrical rod comprising the RGP core section in a second mold having appropriate dimensions, preferably ranging from about 12 to 20 mm in diameter and from about 15 to 305 mm in length, whereby the diameter of the mold is greater than the diameter of the cylindrical rod comprising the RGP core section. The rod is affixed centrally in the mold and the edge monomer mixture added to the mold whereby the edge monomer mixture surrounds the RGP core. In this step, the choice of mold materials is particularly important, since adhesion of the relatively "soft" edge section can result in tearing of the finished lens button. Most preferably, the mold material is made from a polyolefin material, such as polyethylene or polypropylene.

Polymerization of the edge monomer mixture is achieved relatively slowly, to facilitate the formation of a gradient of the edge polymer in the matrix of the RGP core. Polymerization is achieved by incubation of the edge monomer mixture in the mold surrounding the RGP core section at a temperature of from about 24 to 40° C. for about 48 to 96 hours, but preferably at about 30° C. for from about 48 to 72 hours, followed by incubation at about 60 to 75° C. for 24 to 72 hours. Properly performed, polymerization results in slight shrinkage of the finished bimodular lens rod from the mold material, facilitating removal of the material from the mold.

Lens buttons prepared as described can be processed into bimodular contact lenses using means well-established in the ophthalmic lens arts, including lathing and polishing of the lens surfaces to yield a contact lens of the appropriate thickness.

In addition to the methodologies described hereinabove, it should be noted that the subject bimodulus lenses may also be made by cast molding techniques.

The Examples which follow are illustrative of specific embodiments of the invention, and various uses thereof. They set forth for explanatory purposes only, and are not to be taken as limiting the invention.

EXAMPLE 1

A number of bimodulus contact lens articles were made according to the subject invention and are described below.

A number of RGP core sections were prepared using the specific monomer mixtures provided below in Tables I and II. Once prepared, the monomer mixtures were poured into polyethylene molds having a diameter of about 13 mm and a length of about 200 mm. The monomer mixtures were heated under a nitrogen atmosphere at about 40° C. for 72 hours followed by 48 hours at 65° C. The polymerized rods were demolded and ground to the appropriate diameter.

TABLE I

| Constituent | Wt. % of Constituents in Core Section | |
| --- | --- | --- |
|  | Examples 1, 9 & 10 | Examples 2–8 |
| Methyl methacrylate | 22.9 | 17.4 |
| Neopentyl methacrylate | 9.9 | 0.0 |
| Methacrylic acid | 3.4 | 3.0 |
| N-vinyl pyrrolidone | 7.0 | 7.5 |
| Neopentylglycol dimethacrylate | 7.0 | 7.5 |
| Bis(hexafluoroisopropyl) itaconate | 29.8 | 39.3 |
| Methacryloxypropyl tris-(trimethylsilyl) siloxane | 8.0 | 24.8 |
| $M_2D_{25}$ or Pentacontamethyl-a,w-bis-(4-methacryloxybutyl)-pentacosasiloxane | 11.9 | 0.0 |
| ADMV | 0.054 | 0.054 |
| AIBN | 0.17 | 0.17 |
| TOTAL | 100 | 100 |

Subsequently, the polymerized RGP core sections were inserted into molds of approximately 13 mm in diameter and 229 mm in length, the rods being centered in the molds by means of centering rings. The mold material was polyethylene, chosen in part due to the lack of affinity of this material for the edge monomer mixture. The edge monomer mixtures for each example are provided below in Table III. Polymerization of each edge composition was performed under conditions wherein the edge monomer mixtures were allowed to infiltrate into the RGP rods, forming an interpenetrating network of the two polymer compositions. Polymerization of the edge monomer mixtures was achieved by incubating the molds at about 30° C. for 48 to 72 hours, followed by incubation at about 65° C. for 24 to 48 hours. Polymerization resulted in a minimal amount of shrinkage of the edge material from the walls of the mold, sufficient however to allow the polymerized bimodulus rod to be removed from the mold.

TABLE II

| Constituent | Wt. % of Constituents in Edge Section for Examples 1–10 | | | | | | | | | |
| --- | --- | --- | --- | --- | --- | --- | --- | --- | --- | --- |
|  | 1 | 2 | 3 | 45 | 5 | 6 | 7 | 8 | 9 | 10 |
| butyl methacrylate | 17.2 | 21.3 | 23.4 | 27.5 | 29.6 | 29.1 | 29.1 | 28.2 | 27.1 | 29.1 |
| butyl acrylate | 0.00 | 0.00 | 0.00 | 45.0 | 0.00 | 0.00 | 0.00 | 0.00 | 0.00 | 0.00 |
| trifluoroethylmethacrylate | 19.1 | 15.1 | 13.0 | 8.9 | 6.8 | 6.7 | 6.7 | 6.5 | 6.3 | 6.7 |
| PEG methacrylate | 19.1 | 19.0 | 19.0 | 19.0 | 19.0 | 11.5 | 18.7 | 21.1 | 17.5 | 18.7 |
| Tris | 38.27 | 38.2 | 38.19 | 38.19 | 38.2 | 37.5 | 37.5 | 36.4 | 35.0 | 37.5 |
| PEG dimethacrylate | 0.00 | 0.00 | 0.00 | 0.00 | 0.00 | 10.2 | 3.0 | 0.00 | 9.5 | 3.0 |
| neopentyl dimethacrylate | 3.0 | 3.0 | 3.0 | 3.0 | 3.0 | 0.00 | 0.00 | 3.0 | 0.00 | 0.00 |
| methacrylic acid | 3.35 | 3.34 | 3.34 | 3.34 | 3.3 | 5.0 | 5.0 | 4.8 | 4.65 | 5.0 |

TABLE II-continued

| | Wt. % of Constituents in Edge Section for Examples 1–10 | | | | | | | | | |
|---|---|---|---|---|---|---|---|---|---|---|
| Constituent | 1 | 2 | 3 | 45 | 5 | 6 | 7 | 8 | 9 | 10 |
| ADMV | 0.05 | 0.05 | 0.05 | 0.05 | 0.05 | 0.05 | 0.05 | 0.05 | 0.05 | 0.05 |
| AIBN | 0.17 | 0.17 | 0.17 | 0.17 | 0.17 | 0.17 | 0.17 | 0.17 | 0.17 | 0.17 |

Wherein Tris denotes methacryloxypropyl tris(trimethylsilyl)siloxane.

TABLE III

| | Example No. | | | | | | | | | |
|---|---|---|---|---|---|---|---|---|---|---|
| Property | 1 | 2 | 3 | 4 | 5 | 6 | 7 | 8 | 9 | 10 |
| Refractive index | 1.459 | 1.461 | 1.463 | 1.467 | 1.466 | 1.468 | 1.469 | 1.468 | 1.468 | 1.464 |
| Rockwell | 119 | 105 | 103 | 98 | 87 | 90 | 67 | 101 | 92 | 69 |
| Flexual Modulus (MPa) | 600 | 486 | 470 | 426 | 371 | 260 | 364 | 282 | 388 | 272 |
| Toughness (MPa *mm/mm) | 2.35 | 1.96 | 1.85 | 1.69 | 1.48 | 1.48 | 1.24 | 1.61 | 1.16 | 1.13 |

Lens buttons were cut and ground from the bimodulus rods described above using standard techniques to produce contact lenses having RGP core sections annularly surrounded by soft edge sections. The lenses were characterized as being "bimodular" in stiffness, thus providing the advantages of a RGP lens with the comfort of a soft lens. Furthermore, the subject bimodulus lenses resisted tearing between the core and edge sections.

I claim:

1. A bimodulus contact lens article comprising a rigid gas-permeable polymeric core section with a diameter of about 7 to about 11 mm and a soft edge section with a width of about 0.5 to about 4 mm attached annularly about said core section;

said contact lens article characterized by said edge section comprising a crosslinked composition polymerized from a monomer mix including at least 15 weight percent of monomers represented by Formula I:

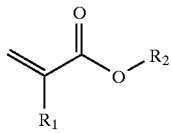

(I)

wherein $R_1$ is selected from: hydrogen and a methyl group, and $R_2$ is selected from alkyl groups having from 1 to 8 carbon atoms, so long as $R_1$ and $R_2$ are not both methyl groups; and wherein said soft edge section is annularly attached to said core by an interpenetrating network of said crosslinked composition into said core section, wherein said crosslinked composition of said edge section has a modulus of from about 50 to 700 MPa and wherein the core section has a modulus of from about 1200 to 2300 MPa.

2. A contact lens article as set forth in claim 1 wherein said crosslinked composition of said edge section has a Tg less than about 80° C.

3. A contact lens article as set forth in claim 1 wherein said crosslinked composition of said edge section has a Tg from about 20 to 80° C.

4. A contact lens article as set forth in claim 1 wherein said crosslinked composition of said edge section has a Tg at about body temperature.

5. A contact lens article as set forth in claim 1 wherein said crosslinked compositions comprises less than 35 weight percent of the monomer represented by Formula I.

6. A contact lens article as set forth in claim 1 wherein the monomeric mix from which said crosslinked composition is polymerized comprises a dimethacrylate as a crosslinking agent.

7. A contact lens article as set forth in claim 1 wherein the monomeric mix from which said crosslinked composition is polymerized comprises from 5 to 25 weight percent of at least one of a fluoroalkylmethacrylate or fluoroalkyl itaconate.

8. A contact lens article as set forth in claim 1 wherein the monomeric mix from which said crosslinked composition is polymerized from comprises from 2 to 10 weight percent of methacrylic acid.

9. A contact lens article as set forth in claim 1 wherein the monomeric mix from which said crosslinked composition is polymerized from comprises from 5 to 25 weight percent of polyethyleneoxide methacrylate.

10. A contact lens article as set forth in claim 1 wherein said crosslinked composition of said edge section is non-water swellable.

11. A contact lens article as set forth in claim 1 wherein the homopolymer of the monomer represented by Formula I has a Tg of less than 80° C.

12. A contact lens article as set forth in claim 1 wherein the homopolymer of the monomer represented by Formula I has a Tg of less than about 25° C.

13. A contact lens article as set forth in claim 1 wherein $R_2$ is an alkyl group having from 2 to 6 carbon atoms.

14. A contact lens article as set forth in claim 1 wherein the homopolymer of the monomer represented by Formula I comprises at least one of butyl methacrylate and butyl acrylate.

15. A contact lens article as set forth in claim 1 wherein said core section comprises a rigid gas-permeable polymeric material polymerized from a monomer mix including at least 5 weight percent of monomers represented by Formula II:

(II)

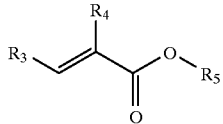

wherein: $R_3$ and $R_4$ are independently selected from: hydrogen, methyl, and a group represented by Formula III:

(III)

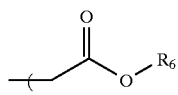

so long as if one of $R_3$ or $R_4$ is a group represented by Formula III, the other is hydrogen; and $R_5$ and $R_6$ are independently selected from: hydrogen, an alkyl group having form 1 to 12 carbon atoms, a fluoroalkyl group, and a siloxanyl group.

16. A contact lens as set forth in claim 15 wherein the monomer represented by Formula II is an itaconate.

17. A contact lens as set forth in claim 15 wherein the monomer mix from which said rigid gas-permeable polymeric material is polymerized includes at least 3 weight percent of monomers represented by Formula IV:

(IV)

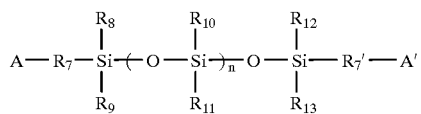

wherein A and A' are independently selected from activated unsaturated radicals; $R_7$ and $R_{7'}$ are independently selected from divalent hydrocarbon radicals having from 1 to 22 carbon atoms, and $R_8$, $R_9$, $R_{10}$, $R_{11}$, $R_{12}$, and $R_{13}$ are independently selected from: monovalent hydrocarbon radicals having from 1 to 12 carbon atoms, monovalent hydrocarbon radicals having from 1 to 12 carbon atoms and further including ether linkages, halogen-substituted monovalent hydrocarbon radicals having from 1 to 12 carbon atoms, and halogen-substituted monovalent hydrocarbon radicals having from 1 to 12 carbon atoms further including ether linkages; and n is a number averaging between about 15 and 50.

18. A contact lens article of claim 17 wherein the monomer mix from which said rigid gas-permeable polymeric material is polymerized comprises:

(a) from about 5 to about 60 weight percent of the monomers represented by Formula II;

(b) from about 3 to about 24 weight percent of the monomers represented by Formula IV; and (c) from about 1 to about 25 weight percent of a hydrophilic monomer.

* * * * *